(12) United States Patent
James et al.

(10) Patent No.: US 7,188,642 B2
(45) Date of Patent: Mar. 13, 2007

(54) LOW-FRICTION PULL TAPE

(75) Inventors: Benjamin B. James, Birchrunville, PA (US); Angela L. Baer, Conshohocken, PA (US)

(73) Assignee: Federal Mogul World Wide, Inc., Southfield, MI (US)

(*) Notice: Subject to any disclaimer, the term of this patent is extended or adjusted under 35 U.S.C. 154(b) by 177 days.

(21) Appl. No.: 11/063,321

(22) Filed: Feb. 22, 2005

(65) Prior Publication Data
US 2005/0185902 A1  Aug. 25, 2005

Related U.S. Application Data

(60) Provisional application No. 60/546,370, filed on Feb. 20, 2004.

(51) Int. Cl.
- H02G 1/08 (2006.01)
- D03D 3/00 (2006.01)
- D03D 1/00 (2006.01)
- D03D 23/00 (2006.01)

(52) U.S. Cl. ............... 139/384 R; 139/383 R; 139/387 R; 139/426 R; 139/406; 174/34; 174/36; 174/19

(58) Field of Classification Search ........ 174/34, 174/36, 19; 139/383 R, 384 R, 387 R, 404–406, 139/426 R
See application file for complete search history.

(56) References Cited

U.S. PATENT DOCUMENTS

| | | | |
|---|---|---|---|
| 3,961,652 A * | 6/1976 | Hasuda et al. ......... 139/384 B |
| 4,508,317 A | 4/1985 | Conti ........................ 254/134.3 |
| 5,027,864 A | 7/1991 | Conti et al. ................ 138/177 |
| 5,238,278 A * | 8/1993 | Kamper ....................... 294/74 |
| 5,720,322 A * | 2/1998 | Soderberg et al. ....... 139/420 A |
| 6,199,597 B1 * | 3/2001 | David ....................... 139/383 R |
| 6,671,440 B2 | 12/2003 | Morris ....................... 385/100 |
| 6,718,100 B2 * | 4/2004 | Morris ....................... 385/100 |
| 6,876,797 B2 * | 4/2005 | Morris ....................... 385/100 |
| 6,959,737 B2 * | 11/2005 | Ward ....................... 139/383 A |
| 7,078,615 B2 * | 7/2006 | Gladfelter et al. ........... 174/36 |
| 7,085,458 B2 * | 8/2006 | Morris ....................... 385/110 |

FOREIGN PATENT DOCUMENTS

GB  2 250 385  6/1992

* cited by examiner

Primary Examiner—Robert H Muromoto, Jr.
(74) Attorney, Agent, or Firm—Robert L. Stearns; Dickinson Wright PLLC

(57) ABSTRACT

A pull tape for facilitating positioning of elongated items within a protective sleeve is disclosed. The pull tape is woven of filamentary members preferably using a twill or satin weave that allows floats to form on the surface of the tape that reduce friction between the tape and the sleeve when the tape is drawn through the sleeve. Preferably, the tape is formed of multifilament warp and weft yarns woven in a plain weave with additional monofilament yarns arranged in the warp direction and woven in a twill or satin weave to form the floats in the warp direction. Additional embodiments include tapes having warp members entirely of monofilaments, as well as both warp and weft members being entirely of monofilaments.

19 Claims, 2 Drawing Sheets

LOW-FRICTION PULL TAPE

FIELD OF THE INVENTION

This invention concerns pull tapes for installing elongated items in conduit.

BACKGROUND OF THE INVENTION

Elongated items such as power cables, wiring bundles or optical fiber cables used for telephone, video or computer communication networks are often installed in protective conduit which may be buried underground, strung from support stanchions or positioned within building structures along with other utility and service lines. Such conduit may be, for example, extruded polymer tubes which provide substantially continuous protection to the elongated items from moisture, abrasion, impact and other environmental hazards.

Once the conduit is in place, for example, underground or throughout a building structure, it is difficult to position cables within it because the interior of the conduit is accessible only at isolated node points where the elongated items are connected to components or where splices are effected. Installation of cables and other items is accomplished by drawing the items through the conduit between nodes. The conduit may be long and typically does not follow a straight path, and due to the weight of the elongated items and the tortuous path they must follow, drawing of the items through the conduit requires considerable tensile force.

It is further advantageous to pre-position a plurality of protective sleeves within each conduit in preparation for installation of the elongated items. Each protective sleeve receives an elongated item within an interior space, the item being drawn through the sleeve within the conduit. The sleeves protect the elongated item from abrasion as they are being drawn through the conduit during installation. The sleeves also protect the elongated items from abrasion from other items being drawn through the conduit and provide for efficient use of the conduit interior, allowing elongated items to be organized and separated from one another.

Protective sleeving may be woven from polymer filamentary members to ensure flexibility and toughness. Each sleeve preferably has a pull tape pre-installed within its interior space. The pull tape is used to draw an elongated item through the sleeve for installation of the item within the conduit. In the installation operation, one end of the pull tape is attached to the elongated-item, and the opposite end is manually pulled or attached to a power winch that draws the pull tape, and the elongated item attached thereto, through the sleeve and thereby through the conduit in which the sleeve is positioned.

Pull tapes must withstand significant tensile stress and yet remain flexible so that they can readily comply with the shape of the conduit in which the pull tape is positioned. To provide for high tensile strength as well as flexibility, it is found advantageous to weave or braid the pull tapes from high strength yarns. However, it is found that woven or braided pull tapes encounter significant friction as they are drawn through the protective sleeve within the conduit. The friction between the pull tape and the sleeve increases the force needed for the pull, thus, increasing the chances of a pull tape parting and decreasing the maximum length over which a pull can be effected. Furthermore, it is known that the pull force required to draw a pull tape through a conduit increases geometrically as the number of bends in the conduit increases. Thus, if a conduit run has too many bends, it may not be feasible to draw a pull tape through it because the pull force required for the draw may exceed the tensile limit of the tape. It would be advantageous to mitigate the friction between the pull tape and the sleeve to lower the pull force and thereby decrease the chance of pull tape failure and increase the maximum distance and the number of bends over which an item may be drawn.

SUMMARY OF THE INVENTION

The invention concerns an elongated pull tape for use within a protective sleeve. The pull tape has a lengthwise direction and comprises a plurality of multifilament first yarns extending in the lengthwise direction. A plurality of multifilament second yarns are interwoven with the first yarns. The second yarns are arranged substantially perpendicularly to the first yarns. A plurality of monofilaments are interwoven with the first and second yarns in the lengthwise direction such that portions of the monofilaments extend over two or more adjacent ones of the second yarns thereby defining a plurality of floats positioned in spaced relation in the lengthwise direction. The floats engage the protective sleeve when the pull tape is pulled therethrough and reduce friction between the pull tape and the sleeve.

In an alternate embodiment, the pull tape comprises a plurality of monofilaments extending in the lengthwise direction. A plurality of multifilament yarns are interwoven with the monofilaments. The multifilament yarns are arranged substantially perpendicularly to the monofilaments. A portion of the monofilaments extend over two or more adjacent ones of the multifilament yarns, thereby defining a plurality of floats positioned in spaced relation in the lengthwise direction. The floats are engageable with the protective sleeve when the pull tape is pulled therethrough and reduce friction between the pull tape and the sleeve.

In another embodiment, the pull tape comprises a plurality of first monofilaments extending in the lengthwise direction. A plurality of second monofilaments are interwoven with the first monofilaments, the second monofilaments being arranged substantially perpendicularly to the first monofilaments. Preferably, a portion of the first monofilaments extend over two or more adjacent ones of the second monofilaments, thereby defining a plurality of floats positioned in spaced relation in the lengthwise direction. The floats engage the protective sleeve when the pull tape is pulled therethrough and reduce friction between the pull tape and the sleeve.

The invention also includes, in combination, an elongated protective sleeve defining an interior space for receiving elongated items and a pull tape located within the interior space. The tape has a lengthwise direction and is slidable within the space for facilitating drawing of elongated items therethrough. The pull tape comprises a plurality of first filamentary members extending in the lengthwise direction and a plurality of second filamentary members interwoven with said first filamentary members. The second filamentary members are arranged substantially perpendicularly to said first filamentary members. A plurality of third filamentary members are interwoven with the first and second filamentary members in the lengthwise direction such that portions of the third filamentary members extend over two or more adjacent ones of the second yarns, thereby defining a plurality of floats positioned in spaced relation in the lengthwise direction. The floats engage the protective sleeve when the pull tape is pulled therethrough and reduce friction between the pull tape and the sleeve.

Preferably, the sleeve is formed from interlaced filamentary members.

The pull tape takes the form of various embodiments including first and second filamentary members comprising multifilament yarns and the third filamentary members comprising monofilaments. In another embodiment the second filamentary members comprise multifilament yarns and the first and third filamentary members comprise monofilaments. In yet another embodiment, all of the filamentary members may comprise monofilaments.

DETAILED DESCRIPTION OF THE EMBODIMENTS

Figure 1:
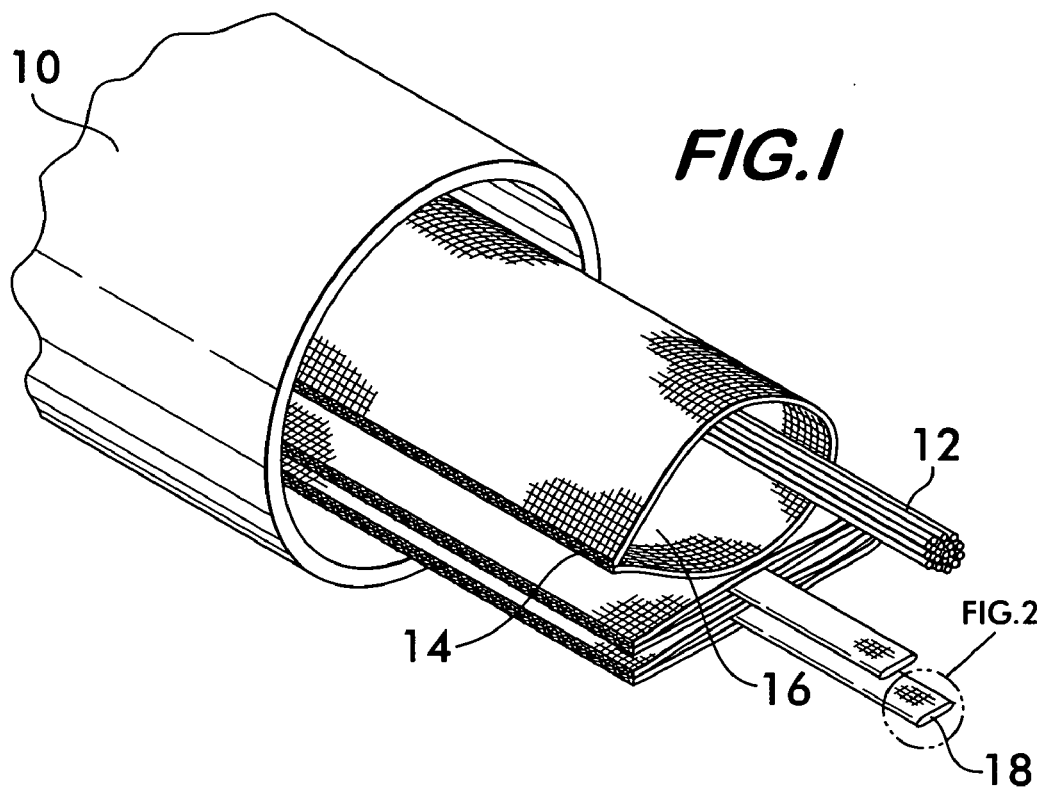
FIG. 1 is a perspective view of a pull tape positioned within a protective sleeve positioned within a conduit.

FIG. 1 shows a conduit 10 for protecting elongated items 12, the elongated items shown schematically representing a wiring harness, a power cable, optical fiber cables or other similar items. A plurality of protective sleeves 14 are positioned within the conduit 10. Sleeves 14 extend over the entire length of the conduit and receive the elongated items 12 within an interior space 16. The sleeves protect the elongated items from abrasion when they are drawn through the sleeve during installation within the conduit 10 and also help organize the space within the conduit, allowing for its efficient use. A pull tape 18 is positioned within each sleeve 14. The pull tape facilitates installation of elongated items 12 within the sleeve. To effect installation, one end of the pull tape is attached to the elongated item and the opposite end is manually pulled or attached to a power winch which draws the pull tape, and consequently, the elongated item through the sleeve, the elongated item replacing the pull tape within the sleeve.

Preferably, sleeves 14 are woven from polymer filaments to provide tensile strength, toughness, abrasion resistance and flexibility. Similarly, pull tapes 18 are preferably woven from high-strength polymer filaments such as polyester and aramids to provide adequate tensile strength to withstand the pulling forces and yet remain flexible so that the path of the conduit may be readily followed during the pull.

Figure 2:
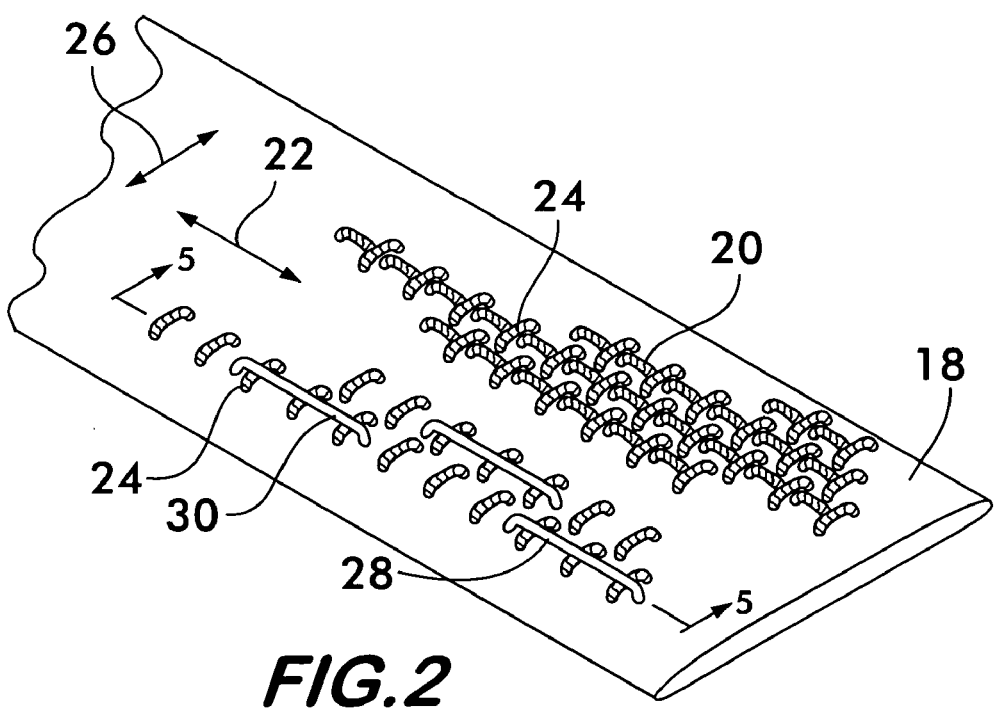
FIGS. 2–4 are a perspective views of various embodiments of pull tapes on an enlarged scale.

FIG. 2 shows, in detail, one embodiment of a pull tape 18 according to the invention. Pull tape 18 is preferably woven and has a plurality of relatively high strength multifilament yarns 20 oriented substantially lengthwise along the pull tape, the lengthwise direction corresponding conveniently to the warp direction 22 of the weave. The pull tape 18 also has weft members 24 extending in the weft direction 26 oriented substantially perpendicular to the warp direction. Preferably, the weft members 24 are also multifilament yarns to preserve flexibility of the pull tape and to control its cost, but as explained below with respect to additional embodiments, other filamentary members, such as monofilaments, could also be used for the weft members.

Pull tape 18 also comprises a plurality of monofilaments 28 which also extend lengthwise along the pull tape in the warp direction 22. Monofilaments 28 are preferably interwoven using a twill or satin pattern so that they form floats 30 that pass (or "float") over two or more weft members 24 as described in detail below.

Figure 5:
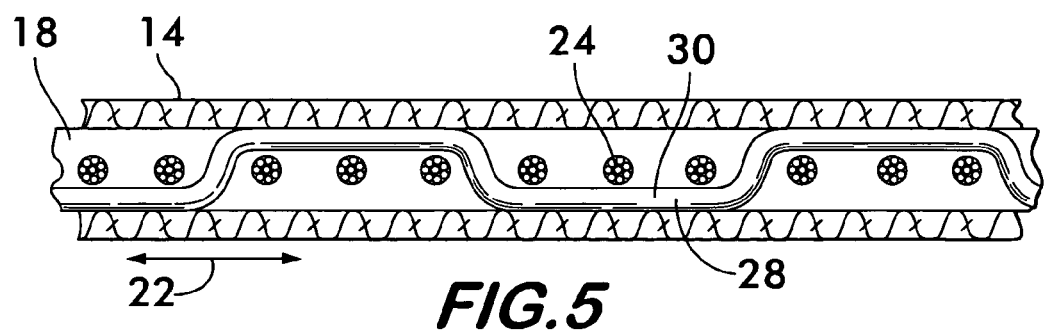
FIG. 5 is a longitudinal sectional view showing floats of a pull tape engaging a protective sleeve.

When compared with pull tapes formed entirely of plain woven multifilament yarns, the combination of multifilament yarns 20 and monofilaments 28 having floats 30 oriented lengthwise along the pull tape 18 is found to significantly reduce the frictional drag developed between the pull tape and the sleeve 14 when the pull tape is drawn through the sleeve. As illustrated in FIG. 5, the reduction in friction is due to the floats 30 being oriented in the warp direction 22 and engaging the sleeve 14. Comparative tests have shown a 61% reduction in the drag force between a pull tape having all monofilaments in the warp direction and a pull tape having all multifilament yarns. Tests have also shown that when three monofilaments are added extending lengthwise along a ½ inch wide pull tape otherwise comprised entirely of multifilament yarns, there is a reduction in frictional drag force of 32%.

Additionally, the reduction in friction force realized by pull tapes according to the invention changes the nature of the relationship between the pull force and the number of bends in the conduit through which the pull tape is being drawn. As noted previously, for known prior art pull tapes, the pull force increased geometrically with the number of bends and the coefficient of friction. However, for pull tapes according to the invention, the coefficient of friction exponent is significantly reduced, thus, allowing both longer lengths of conduit and conduit having more bends to be traversed without fear of the pull tape separating.

Although it is feasible to use 100% monofilament, it is advantageous to have a combination of monofilament and multifilament yarns in the warp or lengthwise direction because the multifilament yarns provide tensile strength and flexibility to the pull tape while the monofilaments reduce the frictional drag forces encountered during the pull. The ratio of monofilaments to multifilament yarns may range between about 1.2 to 1 to about 1 to 10 in practical applications.

A practical example of pull tape according to the invention was manufactured having about 60 warp members of about 1200 denier multifilament polyester yarn and about 20 warp members of polyester monofilament, each monofilament having a diameter of about 0.015 inches. The weft members were about 1200 denier polyester multifilament yarn.

In another example, a pull tape was manufactured having about 50 warp members of about 1200 denier multifilament polyester yarn and about 60 warp members of 0.010 inch diameter polyester monofilament. In yet a further example, a pull tape was manufactured having about 29 warp members of about 2600 denier and 12 monofilaments having a diameter of about 0.015 inches. Examples of pull tape with an all twill pattern have also been manufactured having only monofilaments in the warp direction and only multifilament yarns in the weft direction.

The reduction in frictional force is partially dependent upon the types of weave that are used to create the pull tape. It is found advantageous to weave the multifilament yarns in a plain weave or a modified plain weave while the monofilaments are woven in a twill or satin weave. As shown in FIG. 2, the plain weave results in the multifilament yarns 20 passing over and under the weft yarns 24 in an alternating pattern typical of the plain weave, whereas the monofilaments 28, woven in a twill or satin weave, provide floats 30 that pass over top of two or more of the weft yarns 24 before passing under them. In satin weaves, the warp members tend to float over more weft members than in a twill weave, resulting in longer floats 30, but both weave patterns reduce the stick-slip action that is observed in a plain weave resulting in lower frictional drag.

Figure 3:
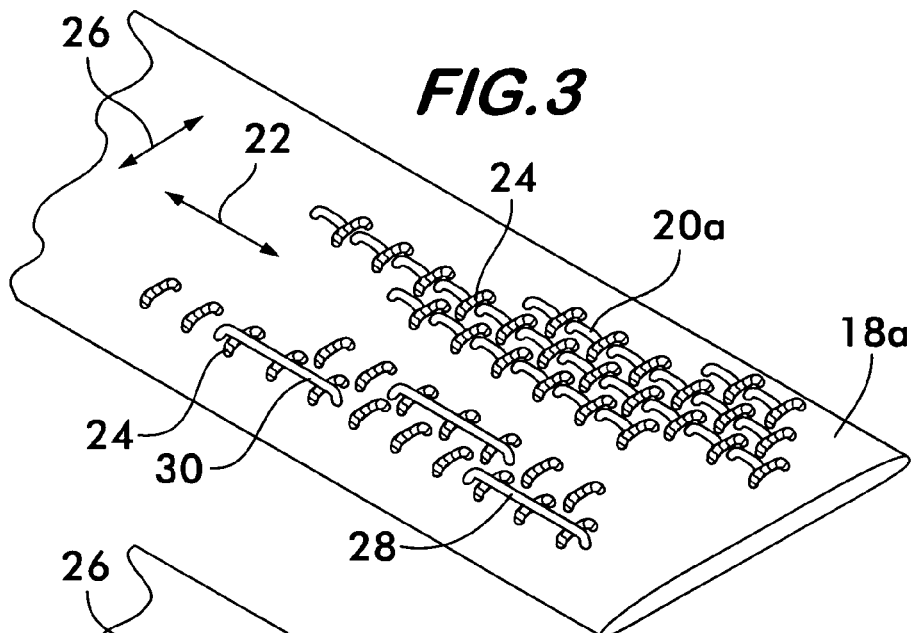

FIG. 3 shows a pull tape embodiment 18a wherein monofilaments 20a are interwoven in the warp direction 22 with multifilaments 24 in the weft direction 26, the weave preferably being a plain weave. Additional monofilaments 28 are interwoven in the warp direction 22 to form floats 30. In this embodiment, all of the warp filamentary members 20a and 28 are monofilaments and all of the weft filamentary members 24 are multifilament yarns. The portion of monofilaments defining the floats may be between about 30% to about 100% of the total number of monofilaments extending in the lengthwise direction.

Figure 4:
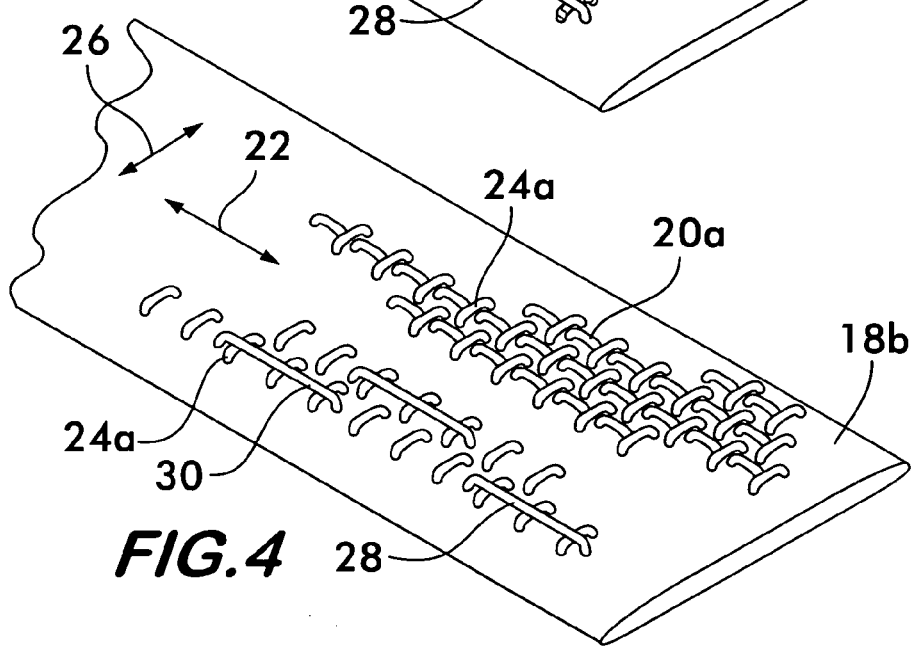

In FIG. 4, a pull tape embodiment 18b is entirely formed of monofilaments. Warp monofilaments 20a are interwoven in a plain weave with weft monofilaments 24a. This configuration alone can be expected to provide a reduction in the pull force. To effect a further reduction, additional monofilaments 28, oriented in the warp direction, are woven in a twill or satin weave forming floats 30 in the warp direction.

Pull tapes according to the invention having both multifilament yarns and monofilaments in the warp or long direction and woven in a twill or satin weave provide adequate strength and flexibility with lower frictional drag than pull tapes formed entirely of multifilament yarns.

What is claimed is:

1. An elongated pull tape having a lengthwise direction and a flat planar woven structure comprising:
    a plurality of multifilament first yarns extending in said lengthwise direction;
    a plurality of multifilament second yarns interwoven with said first yarns, said second yarns being arranged substantially perpendicularly to said first yarns; and
    a plurality of monofilament yarns being interwoven with said second yarns in said lengthwise direction such that portions of said monofilament yarns extend over two or more adjacent ones of said second yarns thereby defining a plurality of floats positioned in spaced relation in said lengthwise direction.

2. A pull tape according to claim 1, wherein the ratio of said monofilament yarns to said multifilament first yarns is between about 1.2 to 1 to about 1 to 10.

3. A pull tape according to claim 1, wherein said first and second multifilament yarns and said monofilament yarns are woven in a twill weave.

4. A pull tape according to claim 1, wherein said first and second multifilament yarns and said monofilament yarns are woven in a satin weave.

5. A pull tape according to claim 1, comprising about 60 of said multifilament first yarns having a denier of about 1200, and about 20 of said monofilament yarns, each of said monofilament yarns having a diameter of about 0.015 inches.

6. A pull tape according to claim 1, comprising about 50 of said multifilament first yarns having a denier of about 1200, and about 60 monofilament yarns, each monofilament yarns having a diameter of about 0.010 inches.

7. A pull tape according to claim 1, comprising about 29 of said multifilament first yarns having a denier of about 2600, and about 12 of said monofilament yarns having a diameter of about 0.015 inches.

8. A pull tape according to claim 1, wherein said portion of said monofilament yarns defining said floats is about 30% to about 100% of the total number of said monofilament yarns extending in said lengthwise direction.

9. In combination, an elongated protective sleeve defining an interior space for receiving elongated items, and a pull tape located within said interior space, said pull tape having a lengthwise direction and a flat woven planar structure and being slidable within said space for facilitating drawing of said elongated items therethrough, said pull tape comprising:
    a plurality of first multifilament yarns extending in said lengthwise direction;
    a plurality of second filamentary yarns interwoven with said first multifilament yarns, said second filamentary yarns being arranged substantially perpendicularly to said first multifilament yarns; and
    a plurality of third monofilament yarns being interwoven with said second filamentary yarns in said lengthwise direction such that portions of said third monofilament yarns extend over two or more adjacent ones of said second filamentary yarns, thereby defining a plurality of monofilament floats positioned in spaced relation in said lengthwise direction, said floats engaging said protective sleeve when said pull tape is pulled therethrough and reducing friction between said pull tape and said sleeve.

10. A combination according to claim 9, wherein said second filamentary yarns comprise multifilament yarns.

11. A combination according to claim 10, wherein the ratio of said third monofilament yarns to said first multifilament yarns is between about 1.2 to 1 to about 1 to 10.

12. An elongated pull tape having a lengthwise direction and a flat planar woven structure comprising:
    a plurality of multifilament first yarns extending in said lengthwise direction;
    a plurality of filamentary second yarns interwoven with said first yarns, said second yarns being arranged substantially perpendicularly to said first yarns; and
    a plurality of monofilament third yarns being interwoven with said filamentary second yarns in said lengthwise direction such that portions of said monofilament yarns extend over two or more adjacent ones of said filamentary second yarns thereby defining a plurality of floats positioned in spaced relation in said lengthwise direction.

13. A pull tape according to claim 12, wherein the ratio of said monofilament third yarns to said multifilament first yarns is between about 12 to 1 to about 1 to 10.

14. A pull tape according to claim 12, wherein said first multifilament yarns and said second filamentary yarns and said monofilament yarns are woven in a twill weave.

15. A pull tape according to claim 12, wherein said first multifilament yarns and said second filamentary yarns and said monofilament yarns are woven in a satin weave.

16. A pull tape according to claim 12, comprising about 60 of said multifilament first yarns having a denier of about 1200, and about 20 of said monofilament third yarns, each of said monofilament yarns having a diameter of about 0.015 inches.

17. A pull tape according to claim 12, comprising about 50 of said multifilament first yarns having a denier of about 1200, and about 60 of said monofilament third yarns, each of said monofilament yarns having a diameter of about 0.010 inches.

18. A pull tape according to claim 12, comprising about 29 of said multifilament first yarns having a denier of about 2600, and about 12 of said monofilament third yarns having a diameter of about 0.015 inches.

19. A pull tape according to claim 12, wherein said portion of said monofilament yarns defining said floats is about 30% to about 100% of the total number of said monofilament yarns extending in said lengthwise direction.

* * * * *